(12) United States Patent
Cromer et al.

(10) Patent No.: US 6,988,808 B2
(45) Date of Patent: Jan. 24, 2006

(54) PROJECTOR WITH COLOR TAPE

(75) Inventors: Daryl Carvis Cromer, Apex, NC (US); George O. Diatzikis, Apex, NC (US); William P. Durham, Jr., Apex, NC (US); Jennifer Lynn Greenwood, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 10/747,766

(22) Filed: Dec. 29, 2003

(65) Prior Publication Data

US 2005/0140936 A1  Jun. 30, 2005

(51) Int. Cl.
G03B 23/08 (2006.01)
G03B 21/14 (2006.01)
G03B 21/16 (2006.01)
G03B 21/18 (2006.01)
H04N 3/12 (2006.01)

(52) U.S. Cl. .................. 353/109; 353/31; 353/57; 353/84; 353/122; 348/742; 348/743

(58) Field of Classification Search ............... 353/31, 353/69, 84, 109, 122, 34, 37, 102; 349/5, 349/7, 8; 358/1.15, 509, 518; 348/742, 348/743, 771; 340/146.3
See application file for complete search history.

(56) References Cited

U.S. PATENT DOCUMENTS

| | | | | |
|---|---|---|---|---|
| 4,009,466 A | * | 2/1977 | Clark | 382/165 |
| 4,362,973 A | * | 12/1982 | Brentlinger | 315/393 |
| 4,455,579 A | * | 6/1984 | Tsukamura | 386/1 |
| 4,764,776 A | * | 8/1988 | Mugrauer et al. | 347/232 |
| 4,788,587 A | * | 11/1988 | Bitoh | 358/502 |
| 5,483,259 A | * | 1/1996 | Sachs | 345/600 |
| 6,488,380 B1 | | 12/2002 | Fujimori | 353/119 |
| 6,545,754 B2 | * | 4/2003 | Her | 356/237.5 |
| 6,778,290 B2 | * | 8/2004 | Oehlbeck et al. | 358/1.15 |
| 6,843,567 B2 | * | 1/2005 | Lee et al. | 353/31 |
| 6,913,360 B2 | * | 7/2005 | Cho et al. | 353/31 |
| 2002/0003704 A1 | | 1/2002 | Ohmae et al. | 362/293 |
| 2002/0135742 A1 | | 9/2002 | Chiang et al. | 353/109 |
| 2004/0119947 A1 | * | 6/2004 | Kim et al. | 353/31 |

\* cited by examiner

*Primary Examiner*—Melissa Jan Koval
(74) *Attorney, Agent, or Firm*—Jeanine S. Ray-Yarletts; Daniel E. McConnell

(57) ABSTRACT

To reduce the thickness of a digital light projector (DLP), a circulating tape having sequences of red, green and blue segments is used instead of a color wheel to produce a color image.

12 Claims, 2 Drawing Sheets

US 6,988,808 B2

PROJECTOR WITH COLOR TAPE

FIELD OF THE INVENTION

The present invention relates generally to color projectors.

BACKGROUND OF THE INVENTION

A digital light projector (DLP) includes a Digital Mirror Device (DMD) that receives a demanded image to produce a video or still image that is projected onto a screen. Current DLP projectors use optics including mirrors and lenses to perform projection. Also, current DLP projectors have a color wheel that rotates through the projected light beam. A lamp emits light that can be reflected through a converging lens to the color wheel (usually divided into three pie slice-shaped segments of red, green and blue, or sometimes four segments including a transparent segment), and the color wheel is rotated at an adjustable speed so that the light passing through it is filtered to alternately generate red, green and blue lights. The color wheel is synchronized with a DLP processor chip that controls the components as appropriate to generate a color display.

As recognized herein, for portability and other reasons it is desirable to configure the projector to be as slim as possible, but the presence of a color wheel frustrates this goal. Specifically, owing to geometry the diameter of the color wheel must be two to three times as large as the internal lens, and is thus the limiting constraint in reducing the size of the projector. Simply reducing the size of the lens (and, hence, permitting use of a smaller color wheel) sacrifices brightness and picture quality and can also add more complexity to the optics, so it is not desirable to do so. With these constraints in mind, the present invention is provided.

SUMMARY OF THE INVENTION

In accordance with embodiments of the present invention, a projector includes a light source generating a light beam, an optics system disposed in the light beam, and a translucent tape disposed in the light beam. The tape has at least one red segment, at least one blue segment, and at least one green segment, and the segments move translationally across the light beam to establish a color image.

The preferred projector is a digital light projector (DLP), and a digital mirror device (DMD) can be disposed in the light path. The tape may be endless, and it may circulate past the DMD.

If desired, a fan can be disposed in a housing that holds the tape, light source, optics system, and DMD, with the tape moving in a plane and the fan exhausting air perpendicular to the plane. The tape has a flat configuration wherein the tape is rectilinear.

In the preferred embodiment set forth more fully below, the tape moves around plural rollers, at least one of which is motor driven. Markers can be engaged with the tape and each marker can be associated with a respective color. The markers are sensed by a sensor to synchronize the tape movement with the operation of the DMD.

In another aspect, a method for producing a demanded image using a digital mirror device (DMD) includes directing a light beam at the DMD, and altering the color of the light beam without using a color wheel.

In still another aspect, a projector includes means for generating a demanded image, and non-rotating translationally-moving means juxtaposed with the means for generating for altering the color of a light beam entering the means for generating.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
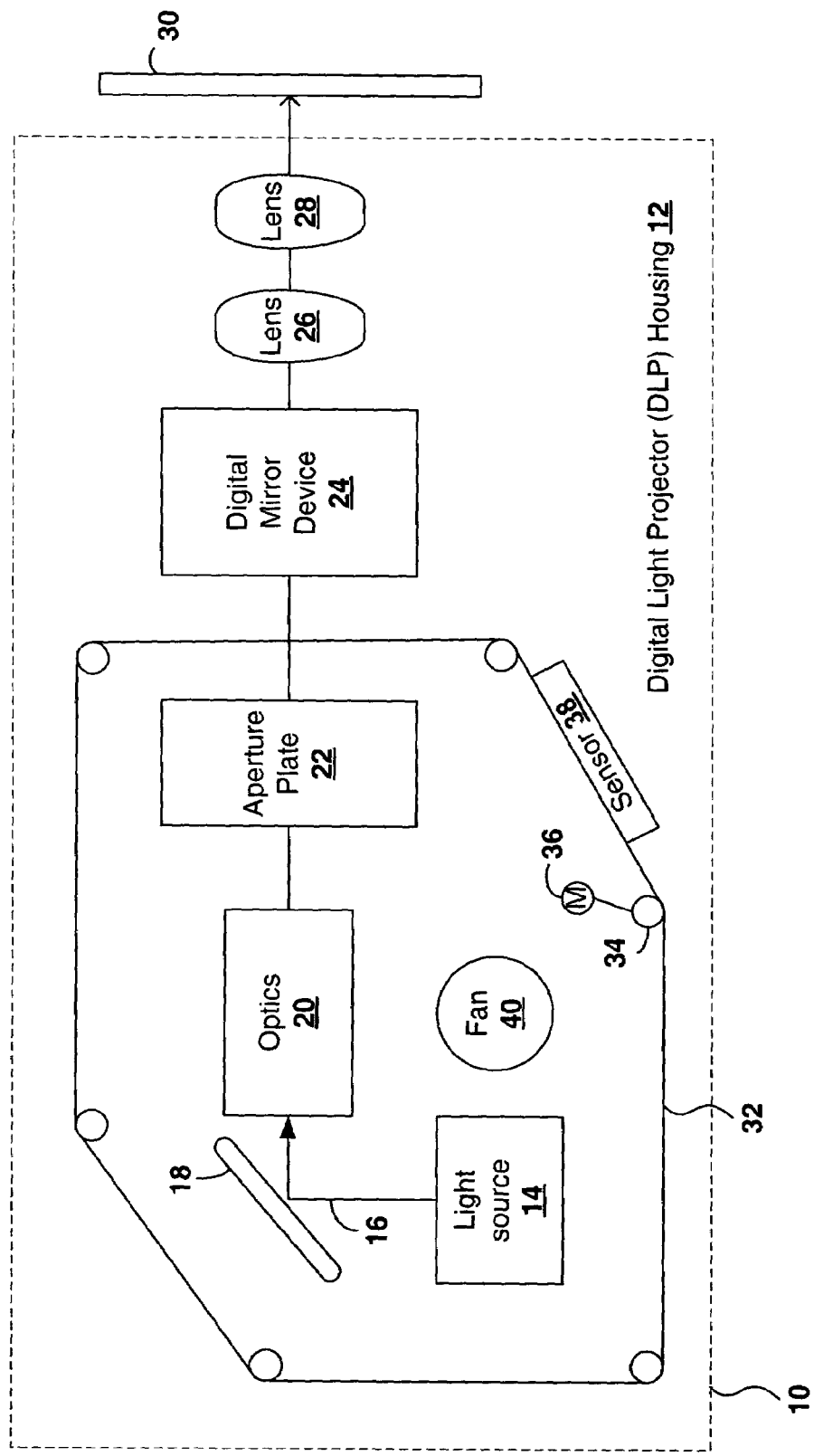
FIG. 1 is a schematic diagram looking down at the components of the present DLP with the cover removed for clarity.

Referring initially to FIG. 1, a digital light projector (DLP) 10 is shown which includes a hollow lightweight housing 12 that holds a DLP light source 14 in accordance with DLP principles known in the art. The light source 14 emits a light beam 16 that can be reflected by a mirror 18 if desired to an optics system 20. The optics system 20 may be a conventional DLP optics system.

The light beam 16 passes through the optics system 20 and through an aperture formed by an aperture plate 22 in accordance with DLP principles known in the art before entering a digital mirror device (DMD) 24 made by, e.g., Texas Instruments. In accordance with DMD principles known in the art, the DMD 24 receives a demand for an image, and small mirrors in the DMD 24 cooperate to either pass light or not depending on the demanded image, so that, e.g., when a red light beam enters the DMD 24, some DMD mirrors reflect the light outward through lenses 26, 28 to a display surface 30 outside the housing 12, and some DMD mirrors do not, to establish red sub-pixels of an image on the display 30. Blue and green subpixels are similarly established, with the colored subpixels together establishing the demanded image.

In accordance with the present invention, unlike a conventional DLP the DLP 10 shown in FIG. 1 does not use a rotating color wheel to establish the red, green, and blue light beams by filtering the light beam 16. Instead, the DLP 10 uses a preferably endless, preferably flexible plastic tape 32 that moves translationally along its long dimension in the housing 12 between the DMD 24 and, e.g., the aperture plate 22 as shown. Preferably, the tape 32 circulates around a path in a constant direction, but in some embodiments the tape 32 might move back and forth in front of the DMD 24. The tape 32 may move against plural rollers 34 that preferably have tacky surfaces, with at least one roller 34 being driven by a motor 36 that can receive signals from the DMD 24 to move the tape 32 for purposes to be shortly disclosed. If desired, the rollers 34 may tilt to facilitate replacing the tape 32.

In addition to the above structure, a marker sensor 38 can be juxtaposed with the tape 32 and connected to the DMD 24 for purposes to be shortly disclosed. Also, to cool the DLP 10, a fan 40 may be disposed in the housing 12 to exhaust air perpendicular to the plane in which the tape 32 moves. That is, the fan 40 may have an intake grating in the cover of the DLP 10 and an exhaust grating in the bottom of the DLP 10.

Figure 2:
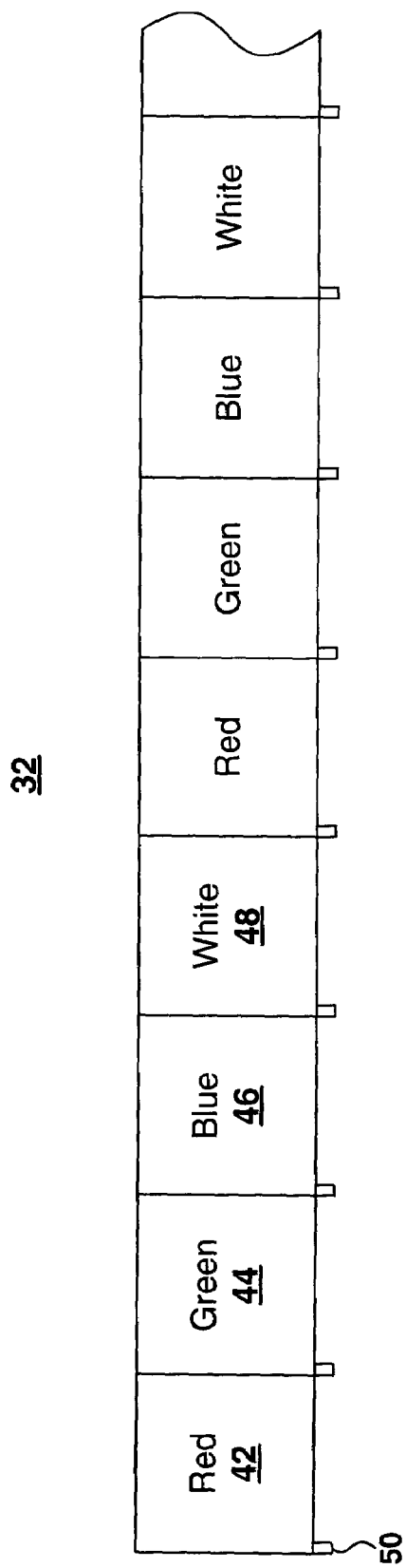
FIG. 2 is an elevational view of the present color tape for DLP.

Now referring to FIG. 2, the preferred tape 32 has plural translucent color segments and if desired for brightness plural transparent "white" segments. More particularly, the preferred tape 32 has plural red color segments 42, each of which is followed by a similarly-sized green segment 44, each of which in turn is followed by a similarly-sized blue segment 46. If desired, to increase image brightness each blue segment 46 may be followed by a white or transparent segment 48, with the pattern then repeating starting with another red segment 42. It can be appreciated in reference to FIGS. 1 and 2 that the tape 32 may be a flexible plastic tape that can be configured in flat configuration as shown, wherein the tape 32 is rectilinear.

Preferably, in an exemplary non-limiting embodiment the speed $S_n$ at which the motor 36 is caused to move the tape 32 may be determined as follows.

Assume that $S_o$=speed the color wheel would otherwise have if not replaced by the tape 32, $S_n$=speed of tape, $N_c$=number of color segments (in the above example, four), and D=diameter of the color wheel if not otherwise replaced by the tape 32. Then, the correct ratio $C_s$ for color segments, i.e., the ratio of the length of each color segment 42, 44, 46 to the circumference of the color wheel that would otherwise be used:

$C_s = \pi D S_n/(N_C S_o)$, where the speed of the tape is ½ the speed that the color wheel otherwise would have had.

FIG. 2 also shows that if desired, plural markers 50 such as small metal tags can be attached to the tape 32 at the start of each segment. The sensor 38 shown in FIG. 1 can sense these markers 50 as they pass in front of the sensor 38 so that the sensor 38 can feed a signal to the DMD 24 for synchronizing the tape 32 movement with DMD 24 operation by appropriately controlling the speed of the motor 36. In one exemplary embodiment, the markers 50 may have respective electrical resistances that are correlated to respective segment colors by the sensor 38.

While the particular PROJECTOR WITH COLOR TAPE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A projector, comprising:
   at least one light source generating a light beam;
   at least one optics system disposed in the light beam; and
   at least one translucent tape at least partially disposed in the light beam, the tape having at least one red segment, at least one blue segment, and at least one green segment, the segments moving translationally across the light beam to establish a color image, the segments establishing a linear sequence of segments such that the light beam impinges on only one segment at a time.

2. The projector of claim 1, wherein the projector is a digital light projector (DLP).

3. The projector of claim 1, further comprising a digital mirror device (DMD) disposed in the light path.

4. The projector of claim 3, wherein the tape is endless.

5. The projector of claim 4, wherein the tape circulates past the DMD.

6. The projector of claim 3, further comprising at least one fan disposed in a housing, the housing holding the tape, light source, optics system, and DMD, the tape moving in a plane, the fan exhausting air perpendicular to the plane.

7. The projector of claim 3, wherein the tape has plural red segments, plural green segments, and plural blue segments, the tape having a flat configuration wherein the tape is rectilinear.

8. The projector of claim 1, wherein the tape moves around plural rollers, at least one roller being motor driven.

9. The projector of claim 3, comprising markers engaged with the tape, each marker being associated with a respective color, the markers being sensed by a sensor.

10. Apparatus comprising:
    a digital light projector (DLP) having a digital mirror device (DMD) disposed in the projection light path, the DLP generating demanded image;
    a non-rotating, translationally moving endless tape juxtaposed with said DMD for altering the color of a light beam, the tape having at least one red segment, at least one blue segment, and at least one green segment.

11. The projector of claim 10, wherein the tape circulates past the DMD.

12. The projector of claim 10, further comprising at least one fan disposed in a housing, the housing holding the tape, a light source, an optics system, and the DMD, the tape moving in a plane, the fan exhausting air perpendicular to the plane.

* * * * *